United States Patent [19]

Patterson

[11] 4,052,558
[45] Oct. 4, 1977

[54] DATA TRANSMISSION SYSTEM

[76] Inventor: Colin Davey Patterson, 65 Downsview Crescent, Ottawa, Ontario, Canada

[21] Appl. No.: 530,710

[22] Filed: Dec. 9, 1974

[51] Int. Cl.² .............................................. H04B 1/00
[52] U.S. Cl. ....................................... 178/68; 178/88; 325/38 R; 325/320; 325/351; 307/216
[58] Field of Search ............................. 178/68, 88, 67; 340/347 DA, 347 AD; 332/9 R, 9 T; 325/38 R, 320, 419, 346, 349, 351, 30; 307/208, 216; 328/27, 28, 63; 329/122, 126, 128, 123; 179/15.55 R, 15 BW

[56] References Cited

U.S. PATENT DOCUMENTS

| | | | |
|---|---|---|---|
| 3,462,702 | 8/1969 | McCormick | 325/346 X |
| 3,590,384 | 6/1971 | Van Gerwen | 325/38 R X |
| 3,611,143 | 10/1971 | Van Gerwen | 178/68 X |
| 3,699,447 | 10/1971 | Frost | 325/50 X |
| 3,758,870 | 9/1973 | Schmitt et al. | 329/122 X |
| 3,846,583 | 11/1974 | Boulter | 178/67 |

Primary Examiner—Robert L. Griffin
Assistant Examiner—Tommy P. Chin
Attorney, Agent, or Firm—Robert J. Schaap

[57] ABSTRACT

A modem adapted to enable data transmission over information communication links, such as a voice-grade telephone line. The modem includes a modulator where a binary data source and a clock pulse source are connected to an exclusive OR gate which provides an output pulse train including pulses having widths which are a function of the binary data. The pulse train is applied to a flip-flop and thereafter the output of the flip-flop is introduced into a low-pass filter to provide a sinusoidally varying frequency signal. This signal from the low-pass filter is demodulated by a demodulator circuit which in a first embodiment of the present invention employs a counter implemented in the form of digital circuitry. In a second embodiment of the present invention, this demodulator includes a shift register operating in conjunction with a phase locked loop and a controlled oscillator.

24 Claims, 17 Drawing Figures

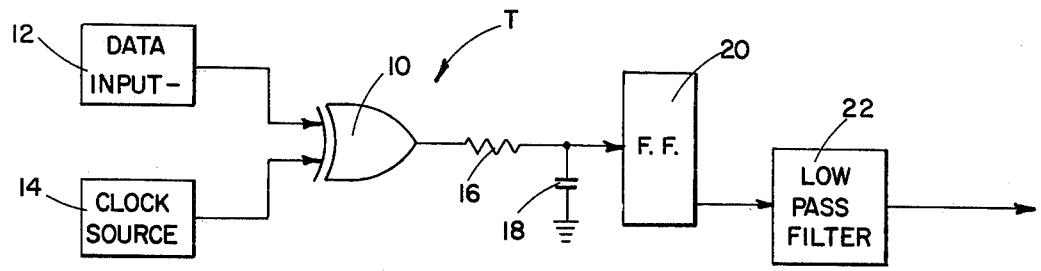
FIG. 1
| BIT PATTERN | OUTPUT | FREQUENCY |
|---|---|---|
| 1 0 1 0 1 | | $\frac{1}{4}$ BIT RATE |
| 1 0 0 1 | | $\frac{1}{3}$ BIT RATE |
| 1 1 1 1 | | $\frac{1}{2}$ BIT RATE |
FIG. 3
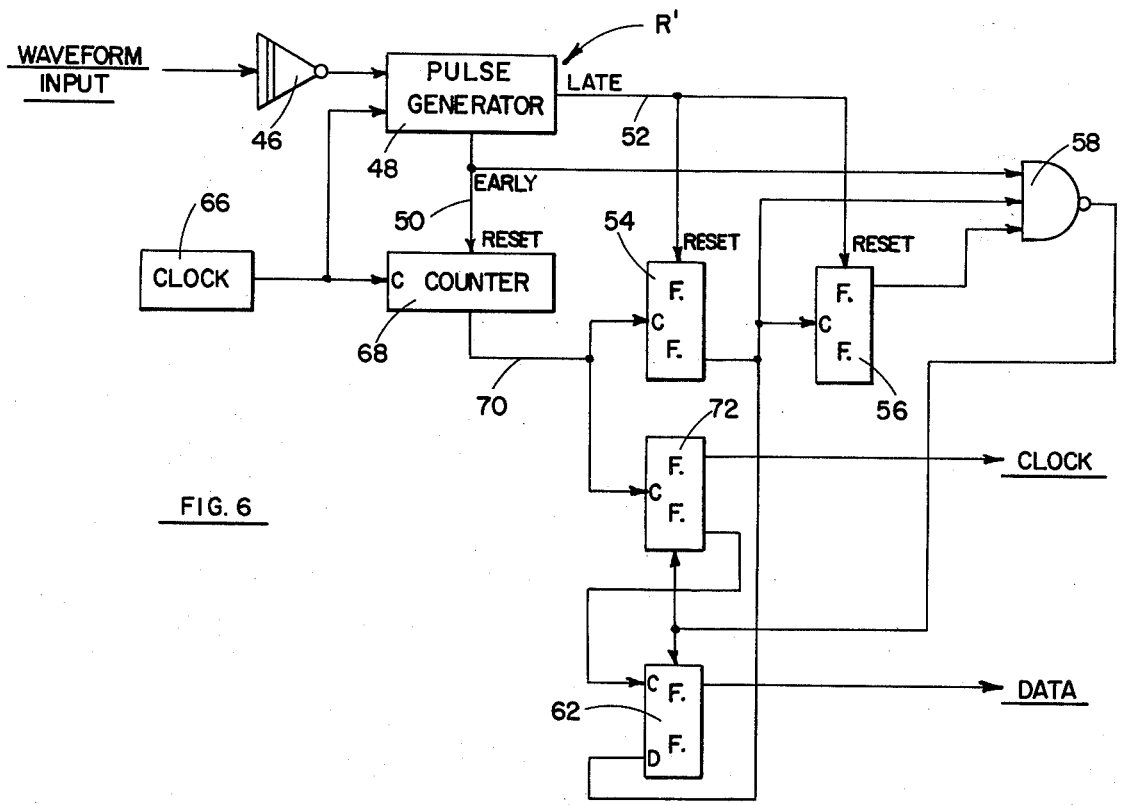
FIG. 6

FIG. 5A — INPUT WAVEFORM
FIG. 5B — POLARITY DETECTOR OUTPUT
FIG. 5C — PHASE LOCK LOOP O/P
FIG. 5D — SHIFT REG. O/P 1ST ST.
FIG. 5E — SHIFT REG. O/P 2ND ST.
FIG. 5F — OUTPUT OF EXCLUSIVE OR
FIG. 5G — OUTPUT OF CLOCK F.F.
FIG. 5H — OUTPUT OF REC'D. DATA

DATA TRANSMISSION SYSTEM

BACKGROUND OF THE INVENTION

This invention relates in general to certain new and useful improvements in data transmission systems, and, more particularly, to simplified data transmission systems which modulate and demodulate pulse trains of binary data and clock pulses.

In recent years, modems (modulators and demodulators) have widespread employment in communication systems where communication is desired between two or more remote pieces of digital equipment. It is recognized that this communication is achieved by means of modems which transmit the data over a transmission link and, at another remote source, receive the data from the transmission link. In many cases, this transmission link may adopt the form of a voice grade communication link, such as a conventional telephone communication link. Notwithstanding, the information communication link may also adopt other forms of communication connections.

The modem is specifically designed to encode the data, which normally exists in a digital format, into an analog form suitable for transmission, and thereafter to accomplish decoding for reconversion of the data into the digital format. These devices usually employ a transmitter which generates a carrier signal and modulates the carrier signal with data to be transmitted. In like manner, a receiver may also be relocated at the remote source for demodulating the carrier and removing the data therefrom.

The presently available modems operate on either asynchronous basis, that is transmission of data without clock information, or, otherwise, on a synchronous basis, where clock information is transmitted on the data track along with the digital data.

One of the primary problems of the presently available synchronous modems, particularly when used on short-distance transmission lines, resides in the fact that these modems are fairly complex in their design. Moreover, these devices are relatively expensive in order to achieve the necessary compression of required bandwidth from the transmission link. In many cases, these modems also require the DC voltage connection from the transmitter to the receiver. In most cases, the modems operate on the basis of transmitting the data information by means of a carrier signal which is generated by a carrier oscillator. Nevertheless, these commercially available modems, which are highly sophisticated, are rather expensive and hence commercially and economically unfeasible for use in a short distance communication.

The present invention obviates these and other problems in the provision of a modem which serves as a substitute for the conventional synchronous modem and eliminates the necessity of a carrier signal. In the modem of the present invention, the data signals are combined with clock pulses for transmission over the voice grade communication links and permits generation of the encoded signals from the combination of the clock pulses and data. The present invention also includes a receiver for decoding the received wave form, in analog format, and permits separation of the data from clock pulses.

It is, therefore, the primary object of the present invention to provide a synchronous modem which is an effective replacement for conventional synchronous modems and which is able to be used on short distance voice grade transmission links.

It is another object of the present invention to provide a modem of the type stated which is relatively simple in its design, but which nevertheless achieves a reasonable compression of required bandwidth from the transmission link and requires no direct DC connection between the transmitter and the receiver in the modem.

It is a further object of the present invention to provide a modem of the type stated which incorporated all of the advantages of a simplified transmitter for purposes of generating a transmitted waveform without the attendant requirement of a carrier signal produced by a carrier oscillator.

It is an object of the present invention to provide a modem of the type stated which is capable of transmitting the data information by combining the data waveform with clock pulses of the type normally present in digital type equipment.

It is an additional object of the present invention to provide a modem of the type stated which may be constructed at a relatively low cost, but which has a high degree of efficiency and may be simply constructed with present-day integrated circuitry technology.

It is another salient object of the present invention to provide a method of transmitting data on short distance voice communication links by combining the data with clock pulses for purposes of transmission and thereafter separating the clock pulses from the data for recovery of the data.

With the above and other objects in view, my invention resides in the novel features of form, construction, arrangement, and combination of parts presently described and pointed out in the claims.

GENERAL DESCRIPTION

The present invention provides a simplified modem which includes the advantages of a simplified transmitter capable of generating a transmitted waveform without the attendant necessity of a carrier oscillator signal. The modem of the present invention employs a combination of digital data combined with clock pulses normally present in digital equipment which are combined for purposes of transmission. A simplified receiver including analog circuitry corrects for the characteristics of the short distance link. One of the embodiments of decoding circuitry employs a counter which is implemented by digital circuitry. A second embodiment of the decoding circuitry employs a shift register operating in conjunction with a phase-lock loop and controlled oscillator and may also be used and may be constructed with present-day integrated circuitry.

The transmitter portion of the modem includes a data input and a clock pulse source which are combined in an EXCLUSIVE-OR gate which is assigned to generate a data wave form. A small filter network may be connected to the output of the OR gate in order to suppress logic transients. The output of the EXCLUSIVE-OR gate is divided by a flip-flop and the wave form is then applied to a low-pass filter network. This low-pass filter network will suppress the higher harmonics in the wave form and thereby only transmit the fundamental frequencies in order to effectively achieve a bandwidth compression. Consequently, the output of this transmitter results in an encoded wave form which contains both the clock pulses and the data which are constrained in bandwidth. In this way, the modem does not require the provision of a carrier oscillator or modulator, since the transmitted output is derived from the original clock signal introduced into the modem.

The present invention provides two forms of receivers or demodulators, as described above. The first demodulator employs a polarity detector which is designed to detect the polarity of the wave form at various zero crossings thereof. The input wave form is introduced into this polarity detector which produces a digital wave form depending upon the polarity of the input signal. The output of the polarity detector, essentially in the form of serial data bits, is then introduced into a phase-lock loop and which receives an input from an oscillator. The phase-lock loop is designed to lock the oscillator to a particular average phase relationship to the output of the polarity detector. Thereafter, the output of the phase-lock loop, maintained at twice the frequency of the serial data bits, is applied to a two-stage shift register operable in conjunction with a counter. The shift register operates by shifting on the positive edge of the output of the phase-lock loop. Finally, the shift register is followed by an EXCLUSIVE-OR gate which derives an output from the shift register. A clock flip-flop or similar bistable device is connected to the output of the shift register, and a data flip-flop, or similar bistable device, is similarly connected to the output of the EXCLUSIVE-OR gate. In this way, the output of the clock flip-flop generates a clock pulse train equivalent to the initial clock pulse train introduced into the transmitter and the data flip-flop produces the data in binary format which is equivalent to the input data in the transmitter.

The present invention also provides a modified form of demodulator which operates by means of a counter which starts a counting operation from zero and counts the output of a high frequency oscillator. When a zero transition is detected, the counter presents an output which represents a measured time interval from the previous zero transition. The results of this measurement are keyed to one of three measured values, and in this way it is possible to generate an approximation of the wave form in digital equivalents thereof. The output of the counter is applied to a flip-flop which produces an output similar to the original clock pulse source introduced into the transmitter. Moreover, this demodulator also includes a data flip-flop which is strobed by the clock wave form to produce a data wave form equivalent to the initial data wave form introduced into the transmitter.

BRIEF DESCRIPTION OF THE DRAWINGS

Figure 4:
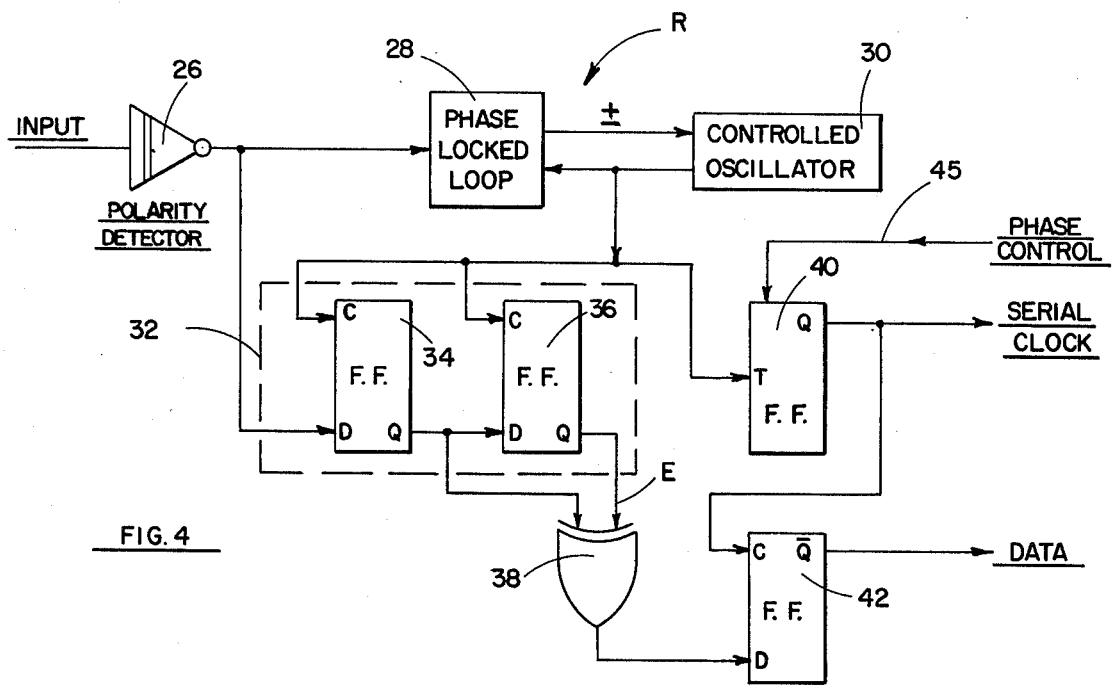

Having thus described the invention in general terms, reference will now be made to the accompanying drawings in which:

FIG. 1 is a schematic view of a transmitter forming part of the modem of the present invention;

FIGS. 2A, B, C, D & E are is a composite of several wave forms which are generated at various components in the circuit of FIG. 1;

FIG. 3 is a diagrametic view of various output signal possibilities with respect to bit rate for given bit patterns capable of being generated by the transmitter of FIG. 1;

FIG. 4 is a schematic view of a receiver forming part of the modem of the present invention;

FIGS. 5A, B, C, D, E, F, G & H are a diagrammatic composite view of several wave forms which are produced at various components in the receiver of FIG. 4; and FIG. 6 is a shcematic view of a modified form of receiver constructed in accordance with, and embodying, the present invention.

DETAILED DESCRIPTION

Referring now in more detail and by reference characters to the drawings which illustrate preferred embodiments of the present invention, a synchronous digital data transmission system constructed in accordance with and embodying the present invention is more fully illustrated in the block diagrams of FIGS. 1, 4 and 6 and illustrates the major components of this new modem. The data transmission system will also include a transmitter T, more fully illustrated in FIG. 1 of the drawings, with the wave forms generated in various components thereof more fully illustrated in FIG. 2 of the drawings.

Figure 5:
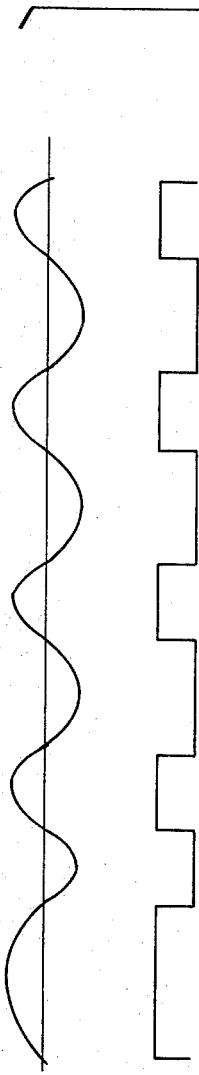
Figure 5:
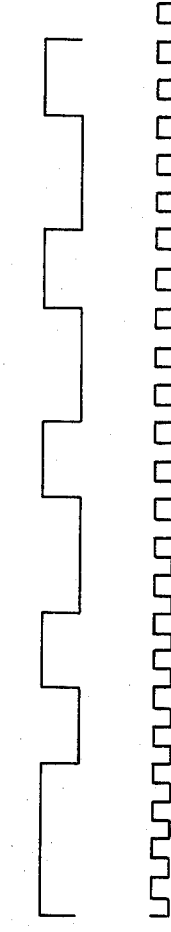
Figure 5:
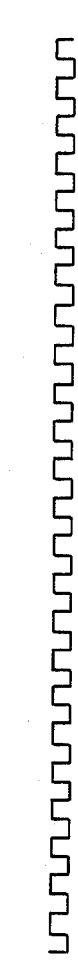
Figure 5:
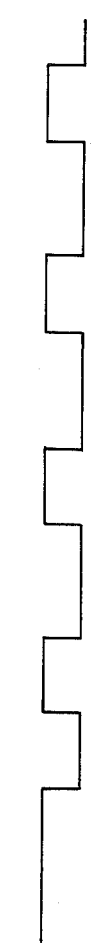
Figure 5:
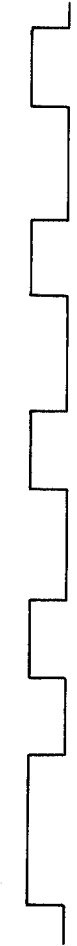
Figure 5:
Figure 5:
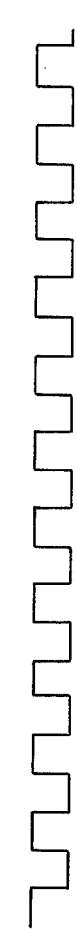
Figure 5:
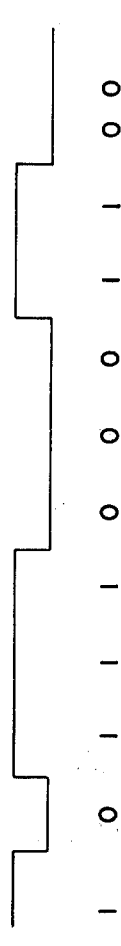

The data transmission system also includes a receiver R, and one embodiment of this receiver is more fully illustrated in FIG. 4 of the drawings, with the wave forms produced thereby being more fully illustrated in FIG. 5 of the drawings. Another embodiment of the receiver of the present invention is more fully illustrated in FIG. 6 of the drawings.

In any synchronous data transmission system, the system will normally include a data transmitter at one end of a communication link and a data receiver at the other end of the communication link. It may be preferable to include a transmission link compensator which is generally designed to smooth out the frequency slope of the incoming signals to the receiver. Any of a number of transmission link compensators may be used, although one particular embodiment of such a compensator which is effective in the present invention includes a variable gain input stage which is provided on its output with one or more stages of variable frequency slope amplifiers.

When natural cable pairs are used as the transmission link, the line characteristic may be considered to include a low frequency loss and a slope characteristic in which loss increases with the higher frequencies. Consequently, the variable gain stage will compensate for the loss of the line and the succeeding variable slope stages will compensate for the slope characteristics of the line.

The transmitter T generally comprises an exclusive OR gate 10 which receives a data input from an input source 12 and which is primarily in binary format. In addition, the gate 10 receives clock pulses from a clock pulse source 14 which may form part of the modem and may be present in the form of a clocking oscillator.

Connected to the output of the OR gate 10 is a small filter network comprising a resistor 16 and a capacitor 18 which is also grounded. This small filter network is essentially a loading filter for the OR gate 10 and is designed to suppress logic transients.

Figure 2:
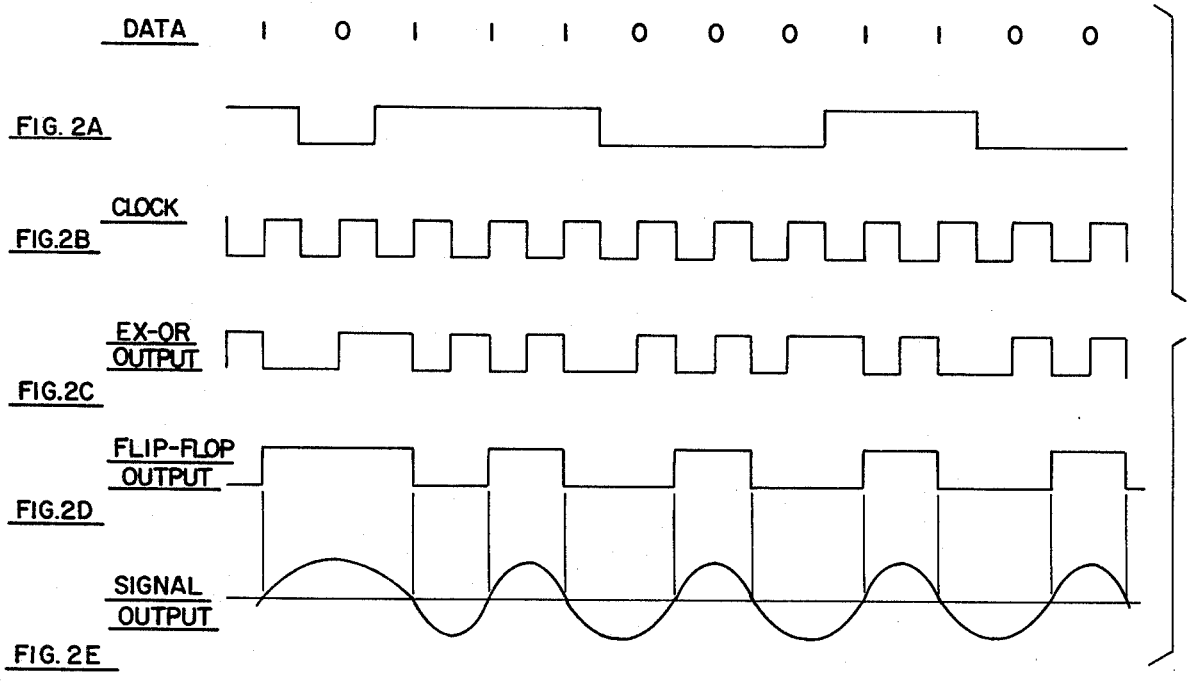

The operation of the transmitter T may best be understood by reference to FIG. 2 of the drawings which illustrates the various wave forms generated at certain portions of the circuitry in FIG. 1. The output of the exclusive OR gate 10, after passing through the small filter network comprised of the resistor 16 and capacitor 18, is more fully illustrated in FIG. 2C of the drawings. A typical representative data form in binary format is more fully illustrated in FIG. 2A, and a typical clock pulse train is more fully illustrated in FIG. 2B of the drawings. In essence, a dividing JK flip-flop 20 connected to the output of the last mentioned filter network divides the wave form generated at the output of the exclusive OR gate 10.

The output of the flip-flop 20 is introduced into a low-pass filter 22, which may be a two-stage output filter network. This filter 22 is designed to suppress the higher harmonics which may be present in the wave form and only transmit the fundamental frequencies in the data in order to produce the transmitted wave form as illustrated in FIG. 2E of the drawings, and which represents the output of the low-pass filter 22 in the form of a phase modulated signal.

This transmitter T is designed to produce a bandwidth compression and a typical bit pattern of the input data and the compression thereof is more fully illustrated in FIG. 3 of the drawings. It can be observed that for a specific bit pattern of 10101, the encoding generated by the transmitter T will produce an output frequency at one-quarter of the bit rate, with a typical wave form shown in FIG. 3. At the opposite extreme, with a bit pattern of all 1's (or all 0's), the transmitter will produce a frequency of one-half the bit rate, with the output wave also illustrated in FIG. 3. In this case, a bit pattern of all 1's has been illustrated. Intermediate the previously described bit patterns, it can be observed that a bit pattern of 1001 will produce an output frequency of one-third the bit rate. It can be observed, therefore, that the transmitter T produces an encoded wave form which contains both the clock pulses and the binary data, and which is constrained in bandwidth. In this way, the transmitter of the present invention does not require any carrier oscillator signal or modulator signal inasmuch as the transmitted output is derived only from the original clock signal, which is combined with the binary input data.

FIG. 4 represents a schematic illustration of a preferred form of a demodulator or receiver R which forms part of the present invention, and the wave forms which are produced at various components in the circuit of FIG. 4 are more fully illustrated in FIG. 5 of the drawings. The receiver R includes a polarity detector 26 which receives an input over an information communication link, such as the voice communication link, and which is generated at the output of the transmitter T.

The input wave form to the receiver R is more fully illustrated in FIG. 5A of the drawings, and, in this respect, it can be observed that the wave form in FIG. 5A corresponds essentially to the wave form in FIG. 2E of the drawings. Again, the polarity detector 26 is designed to determine whether the signal is positive or negative at a specific point in time. The output of the polarity detector 26 is introduced into a phase-lock loop 28, which generates an output to a controlled oscillator 30, and also receives an input therefrom. The polarity detector 26 will effectively generate a digital wave form which depends upon the polarity of the input signal and, hence, the output of the polarity detector is more fully illustrated in FIG. 5B of the drawings. The phase-lock loop 28 and the controlled oscillator 30 are essentially conventional in their construction, and, in this case, the phase-lock loop 28 is arranged to lock the oscillator 30 to a particular average phase relationship which is a function of the output of the polarity detector 26.

The output of the controlled oscillator 30, which is effectively the output of the phase-lock loop 28, is introduced into a two-stage shift register 32 which is comprised of a pair of flip-flops 34 and 36 in the manner as illustrated in FIG. 4 of the drawings. In essence, the output of the phase-lock loop 28 is more fully illustrated in FIG. 5C of the drawings and is in phase with the output of the receiver R.

The flip-flops 34 and 36 are actually clocked as a function of the clock pulses incorporated in the input signal and changed as a function of the pulses at the output from the phase-lock loop 28 so as to merely shift and delay data pulses. The flip-flop 14 effectively functions to delay the input signal by one half bit time. The same holds true with respect to the flip-flop 36.

The phase-lock loop 28 performs a comparison of the time of arrival of the transitions of polarity of the input signal, FIG. 5B, with the occurrence of the positive-going edge of the output of the phase-lock loop 28. The phase-lock loop 28 derives correction signals to speed up or slow down the output of the controlled oscillator 30 in such a way as to maintain the average synchronization of input transitions of polarity with the positive-going edges of the controlled oscillator output. It should be observed that the incoming signal, which is introduced at the input of the receiver R, may be distorted in its passage over the communication link. Nevertheless, the signal which is generated at the output of the phase-lock loop 28 and which is presented to cause the shifting of the two-stage shift register flip-flops 34 and 36 averages out these distortions. In addition, the signal output of the phase-lock loop 28 will strobe the polarity detector output at the correct times to produce a reproduction of the transmitted wave form at the output of the first stage of the shift register flip-flop 34 and at the output of the second stage of the shift register 36, after an extra delay of one-half bit time.

The flip-flop 34 has an output directed to an exclusive OR gate 38 which, in turn, also receives an output from the flip-flop 36. In addition, the flip-flop 34 has an output directed to the flip-flop 36. The output of the flip-flop 34 is more fully illustrated in FIG. 5D of the drawings, and the output of the flip-flop 36 is more fully illustrated in FIG. 5E of the drawings. It can be observed that the output of the flip-flop 34 is slightly offset and advanced with respect to the output of the polarity detector 26. In addition, it can be observed that the output of the flip-flop 36 is offset by one-half a bit rate of the output of the polarity detector 26.

The output of the phase-lock loop 28 is also introduced into a clock flip-flop 40 which produces a serial clock output, more fully designated in FIG. 5G of the drawings. In this respect, it can be observed that the output of the flip-flop 40 is substantially identical to the clock input illustrated in FIG. 2B of the drawings. Moreover, the output of the exclusive OR gate 38 and the output of the flip-flop 40 are introduced into a data flip-flop 42 which also generates a data output, more fully illustrated in FIG. 5H of the drawings. In this same respect, it can be observed that the output of the data flip-flop 42 is substantially identical to the data intput signal illustrated in FIG. 2A of the drawings.

The flip-flop 42 operates in such a manner as to strobe and preserve the state of the wave form presented to the flip-flop's "D" input whenever a positive edge transition occurs in the clock wave form (FIG. 5B). In this manner the flip-flop 42 decodes the original input data signal from the combination pulse train.

The flip-flop 40 divides the output of the phase-lock loop 28 by a factor of two and thus there are two possible phases of this division process with respect to the input wave form. Only one of these phases produces the correct decoding of data from the input wave form and, consequently, it is necessary to provide a separate means to force the clock flip-flop 40 into the correct phase relationship. This function is performed by a pulse introduced into the reset input of the flip-flop 40, over a phase control pulse line 45, at the correct time period. This time period is derived by separate circuitry not shown in FIG. 4, which produces a pulse to force correct phase of flip-flop 40 when a delay of two bit times is detected between changes in the output of the polarity detector 26.

The present invention also provides another preferred form of demodulator, or so-called "receiver", R', as more fully illustrated in FIG. 6 of the drawings. The receiver R' also includes a polarity detector 46 which is similar to the polarity detector 26 and performs the same function thereof, namely, to produce a digital wave form signal which is responsive to the polarity of the input signal. The output of the polarity detector 46 is introduced into a pulse generator 48 which is preferably a digital pulse generator that produces two separate fast digital pulses at each transition of the input wave form, namely an "early" pulse and a "late" pulse. These two digital pulses are related to one another in that the "early" pulse occurs a short time interval before the "late" pulse begins, and these pulses occur on output lines 50 and 52, respectively, from the generator 48. Both the "early" and "late" pulses are short compared to the bit interval of the data being received.

A separate clock oscillator 66 is also provided which is arranged to oscillate at a high frequency compared to the bit rate of transmission. The output of the oscillator 66 is introduced into the pulse generator 48 to synchronize the "early" and "late" pulses to the high frequency oscillator 66.

The output of the oscillator 66 is also introduced into a counter 68 which generally includes a plurality of flip-flops (not shown) connected as a frequency divider chain. The frequency of the oscillator 66 and the number of stages in the counter 68 are related so that the output of the counter 68 is at a frequency equal to twice the bit rate of transmission, said frequency being identical to twice the clock rate. The counter 68 is reset whenever an "early" pulse occurs. This "early" pulse occurs at each transition of the input wave form as previously described and forces the contents of the counter 68 to zero on the occurrence of the "early" pulse. After the early pulse has occurred, the counter 68 begins to count up and to measure the time interval to the next transition in the output of the polarity detector 46.

The counter 68 has an output line 70 which serves as an input to one JK flip-flop 54 which, together with a flip-flop 56, forms a four-state counter. At the occurrence of an "early" pulse, the contents of the four-state counter, comprised of the flip-flops 54 and 56, represent the measured time interval from the last transition in the input wave form.

In actual practice, errors may be introduced into the signal by the characteristics of the transmission link, and, in this way, these errors will appear in the measured time interval. For this reason, a tolerance of ± one-quarter of the bit rate is allowed in each measurement of the synchronizing interval. This tolerance may also be provided by the counter 68 so that contents of the initial bits of the counter represent a measurement of 11 (binary 3) for time intervals from one and three-quarters to two and one-quarter bit times.

If both stages of the counter comprised of flip-flops 54 and 56 are in the one state, then an interval of four half-bit times has been measured from the previous transition. This situation represents a synchronizing interval of two bit times which may be used to set the correct phase of a clock flip-flop 72, which also receives an output from the counter 68 over the output line 70. The detection of the synchronizing interval is performed by an AND gate 58 which receives an output from the pulse generator 48 and an output from the flip-flop 56 which will produce an output at the same time as the "early" pulse if two bit intervals have elapsed since the last transition of the data wave form.

After the contents of the two stage counter comprised of flip-flops 54 and 56 have been decoded and used by the AND gate 58 which occurs at the time of the "early" pulse, the two flip-flops 54 and 56 are cleared by the "late" pulse 52 so that they are ready for measuring the next interval between zero crossings or transitions in the input wave form.

The output of the counter 68 is a frequency of twice the clock frequency and is introduced into a clock flip-flop 72 which is arranged to divide the output of the counter 68. The output of the flip-flop 72 provides a frequency equal to clock rate but is capable of providing this output in two possible phase relationships with respect to the input wave form. Of these two possible phases, only one phase will produce the correct decoding of data. The output of the AND gate 58 is also introduced into the flip-flop 72 to force reset input of this flip-flop 72 and the correct phase of the flip-flop 72 is forced upon the detection of the synchronizing interval by the AND gate 58.

The output of the flip-flop 54 is further introduced into the D input of a data flip-flop 62 which also receives a clock input from the flip-flop 54. The data flip-flop 62 is also driven by an output from the flip-flop 72. The action of the flip-flop 62 is such that the state of the D input is strobed and stored in the flip-flop at the occurrence of the active transition in the output of the clock flip-flop 72. The reset input of the data flip-flop 62 is also driven from the AND gate 58 and is forced to a zero state on the occurrence of a synchronizing interval which, in turn, corresponds to a data triplet of 1 0 1. In this manner, the flip-flop 62 produces a data wave form that is equivalent to the data wave form that was encoded and transmitted by the transmitter circuit previously described.

In this way, it can be observed that the receiver R actually decodes both the clock pulses and the data by a circuit which discriminates the times at which the received wave form passes through zero and the time intervals between such transitions. This circuit is inherently insensitive to noise modulation on the peaks of the wave forms, since information is contained in the zero crossing times, and which presents a basic advantage in this technique of the invention.

Thus, there has been illustrated and described a unique and novel data transmission system and method therefor for transmitting binary data combined with clock pulses over information communication links, and which, therefore, fulfills all the objects and advantages sought therefor. It should be understood that the present invention is not limited to the exact configuration illustrated and described and that many changes, modifications, variations and other uses and applications of the system will, however, become apparent to those skilled in the art after considering this specification and the accompanying drawings. All such changes, modifications, variations and other uses and applications which do not depart from the spirit and scope of the invention are deemed to be covered by the invention which is limited only by the following claims.

Having thus described my invention, what I desire to claim and secure by Letters Patent is:

1. A modem adopted for phase modulated digital data transmission over information communication links without the necessity of a carrier signal, said modem comprising:
   a. input means for receiving input data in a digital binary format,
   b. clocking means for generating a series of clock pulses based on one-half time intervals with respect to the bit rate of the input data,
   c. an exclusive OR gating means operatively connected to said input means and said clocking means to receive the data and clock pulses and generate an output pulse train in encoded waveform and where the pulses in said train have widths which are a function of the binary data and are bandwidth constrained,
   d. a bistable dividing circuit comprised of a first bistable flip-flop operatively connected to said exclusive OR gating means to reduce the number of pulses in said output pulse train to a lesser number of pulses, said lesser number of pulses being directly related to the pulses in said output pulse train, but which have greater bandwidth and which are also bandwidth constrained in order to reduce the frequency spectrum occupied by a phase transition,
   e. signal generating means operatively associated with said dividing circuit to receive the output thereof to thereby provide a two level phase modulated sinusoidal varying frequency signal which lies between one-fourth and one-half of the bit rate of the data and where the phase is related to the data and a previous phase state and with data information contained in a time interval between zero crossings of the sinusoidal varying signal,
   f. said demodulating means operatively connected to said signal generating means operatively associated with said dividing circuit for separating the clock pulses from the binary data to enable recovery of the binary data, said demodulating means comprising a second bistable flip-flop to divide the frequency signal at a rate of one-half of the clock pulse frequency.

2. The modem of claim 1 further characterized in that the information communication link is a voice grade communication link.

3. The modem of claim 1 further characterized in that the information communication link is a voice-grade telephone line enabling transmission of data in each of two opposite directions.

4. The modem of claim 1 further characterized in that said demodulating means comprises a polarity detector receiving said phase modulated sinusoidal varying frequency signal which lies between one-fourth and one-half of the bit rate of the data and where the phase is related to the data and a previous phase state, and a phase-locked loop.

5. The modem of claim 1 further characterized in that said demodulating means comprises a polarity detector receiving said phase modulated sinusoidal varying frequency signal which lies between one-fourth and one-half of the bit rate of the data and where the phase is related to the data and a previous phase state, a phase-locked loop, a flip-flop operatively connected to said phase-locked loop, and an exclusive OR gate operatively connected to said last-named flip-flop.

6. The modem of claim 1 further characterized in that the signal generating means to provide the sinusoidal varying frequency signal is a low pass filter means operatively connected to said dividing circuit to suppress higher harmonics and transmit only the fundamental frequencies of interest.

7. The modem of claim 1 further characterized in that said demodulating means comprises a counter operatively connected to said second flip-flop, to digitize the time interval between two successive zero crossings of the frequency signal at the output of the means providing the sinusoidal varying frequency signal.

8. The modem of claim 7 further characterized in that a pulse generator is operatively interposed between the counter and the bistable dividing circuit.

9. The modem of claim 1 further characterized in that the output of the demodulating means is in a range approximately between the equivalent of one-fourth of the bit rate of the data and the equivalent of one-half of the bit rate of the data.

10. In a digital data transmission system including a transmitter for phase modulated transmission of digital data over voice grade communication links without the necessity of a carrier signal and a receiver at another end of said link for recovering the data, said system comprising:
   a. a transmitter comprising:
      1. input-clocking means for combining an input data source in binary format with a series of clock pulses and where the clock pulses are based on one-half time intervals with respect to the bit rate of the input data,
      2. pulse train generation means for receiving the combined data source and clock pulses, said pulse training generating means comprised of an exclusive OR gate for generating an output where the output pulses have widths which are a function of the bits in the binary data,
      3. and a bistable dividing circuit comprised of a first bistable flip-flop operatively connected to said pulse train generation means to divide the number of output pulses in said output of said exclusive OR gate to a lesser number of pulses, said lesser number of pulses being directly related to the pulses in said output but which are also bandwidth constrained in order to divide the spectral bandwidth occupied by said output,
      4. signal generating means operatively associated with said dividing circuit to receive the output thereof to thereby generate a two level phase modulation sinusoidal varying signal for transmission over the communication link, and which signal is comprised of frequencies which lie between approximately one-fourth and one-half the wavelength of the data bit rate and where the frequencies are phase related to the data and previous phase state and with data information contained in a time interval between zero crossings of the sinusoidal varying frequency signal,
   b. and a receiver comprising:
      1. demodulating means operatively connected to said signal generating means to receive the sinusoidal varying signal and separate the clock pulses from the binary data, said demodulating means comprising a second bistable flip-flop to divide the frequency signal at a rate of one-half of the clock pulse frequency.

11. In the digital data transmission system of claim 10, said system further characterized in that the signal generating means to provide the sinusoidal varying signal comprises a low pass filter connected to the output of said dividing circuit.

12. In the digital data transmission system of claim 10, said system further characterized in that said demodulating means comprises a polarity detector and a phase-locked loop.

13. In the digital data transmission system of claim 10, said system further characterized in that said demodulating means comprises a polarity detector, and a phase-locked loop, said second flip-flop being operatively connected to said phase-locked loop and an exclusive OR gate operatively connected to said second flip-flop.

14. In the digital data transmission system of claim 11, said system further characterized in that said demodulating means comprises a counter to digitize the time interval between two successive zero crossings of the frequency signal at the output of the low pass filter.

15. In the digital data transmission system of claim 14, said system further characterized in that a pulse generator is operatively interposed between the counter and the low pass filter.

16. A method for phase modulated transmission of data in binary format over voice grade communication links, without the necessity of a carrier signal, said method comprising:
 a. combining input data in digital binary format with clock pulses based on one-half time intervals with respect to the bit rate of the input data,
 b. generating an output pulse train in encoded waveform where the pulses in said train have widths which are a fractional function of the bits in the binary data and are bandwidth constrained,
 c. dividing the spectral bandwidth occupied by a phase transmission in a dividing circuit comprised of a first bistable flip-flop to reduce the number of pulses in said output pulse train to a number of pulses in proportional relationship therewith, but which have greater bandwidth and which are bandwidth constrained in order to reduce the frequency spectrum occupied by a phase transmission,
 d. generating a phase modulated sinusoidal varying frequency signal from said divided spectral bandwidth of the pulse train, and which sinusoidal varying signal lies between one-fourth and one-half of the bit rate of the data and where the frequencies are phase related to the data and a previous phase state, and where the data information is contained in a time interval between two successive zero crossings of the sinusoidal varying signal,
 e. transmitting said sinusoidal varying frequency signal over said communication link,
 f. demodulating said signal and separating said binary data from said clock pulses through a second bistable flip-flop to divide the frequency signal at a rate of one-half of the clock pulse frequency, and
 g. recovering the separated binary data.

17. The method of claim 16 further characterized in that the method comprises suppressing higher harmonics in said frequency signal and transmitting only the fundamental frequencies of interest.

18. A receiver circuit for use in modulator-demodulator devices which transmit and receive data with respect to information communication links, said circuit comprising:
 a. input means to receive a phase modulated sinusoidal varying frequency signal containing information representing both binary data and clock pulses and which signal lies between one-fourth and one-half of the bit rate of the data,
 b. polarity detection means operatively connected to said input means to determine the polarity of certain portions of the signal existing between selected zero crossings thereof and generating a digital pulse train where the pulses of said pulse train have widths which are a function of the binary data,
 c. differential phase detection means including at least one first bistable device operatively connected to the output of said polarity detection means to measure the instantaneous time change of phase of the frequencies and compare same to a recovered phase reference based on a previous phase change and to thereby generate a serial clock output,
 d. and at least one second bistable device operatively connected to the output of said differential phase detection means to generate a binary data output.

19. The receiver circuit of claim 18 further characterized in that said bistable devices are flip-flops.

20. The receiver circuit of claim 18 further characterized in that
 a. a phse-locked loop is operatively connected to said polarity detection means,
 b. an oscillator is operatively connected to said phase-locked loop such that the phase-locked loop locks the oscillator to a selected average phase relationship to the output of the polarity detection means,
 c. and a plurality of said bistable devices forming a shift register operatively connected to said phase-locked loop.

21. The receiver circuit of claim 18 further characterized in that a counter is operatively connected to said polarity detection means.

22. The receiver circuit of claim 21 further characterized in that a pulse generator is operatively connected to said counter.

23. A modulator for phase modulated digital data transmission over information communication links without the necessity of a carrier signal, said modulator comprising:
 a. input means for receiving input data in digital binary format,
 b. clocking means for generating a series of clock pulses based on one-half time intervals with respect to the bit rate of the input data,
 c. an exclusive OR gating means operatively connected to said input means and said clocking means to receive the data and clock pulses and generate an output pulse train in encoded waveform and where the pulses in said train have widths which are a function of the binary data and are bandwidth constrained,
 d. a bistable dividing flip-flop operatively connected to an output of said exclusive OR gating means to reduce the number of pulses in said output train to a lesser number of pulses, said lesser number of pulses being directly related to the pulses in said output pulse train but which have greater bandwidth and which are also bandwidth constrained to reduce the frequency spectrum occupied by a phase transmission, and e. signal generating means operatively associated with said dividing flip-flop to receive the output thereof to thereby provide a two level phase modulated sinusoidal varying frequency signal which lies between one-fourth and one-half of the bit rate of the data and where the phase is related to the data and a previous phase state and with data information contained in a time interval between zero crossings of the sinusoidal varying signal.

24. The modem of claim 23 further characterized in that the means to provide the sinusoidal varying signal comprises a low pass filter means which is operatively connected to said dividing flip-flop to suppress higher harmonics and transmit only the fundamental frequencies of interest.

* * * * *